United States Patent
Thompson

(10) Patent No.: US 8,979,523 B2
(45) Date of Patent: Mar. 17, 2015

(54) PROCESS FOR THE MANUFACTURE OF MULTILAYER ARTICLES

(75) Inventor: David Samuel Thompson, Fyshwick (AU)

(73) Assignee: XTEK Ltd. (AU)

( * ) Notice: Subject to any disclaimer, the term of this patent is extended or adjusted under 35 U.S.C. 154(b) by 0 days.

(21) Appl. No.: 14/131,585

(22) PCT Filed: Jul. 6, 2012

(86) PCT No.: PCT/AU2012/000820
§ 371 (c)(1),
(2), (4) Date: Jan. 26, 2014

(87) PCT Pub. No.: WO2013/006900
PCT Pub. Date: Jan. 17, 2013

(65) Prior Publication Data
US 2014/0161922 A1    Jun. 12, 2014

(30) Foreign Application Priority Data
Jul. 8, 2011 (AU) .................................. 2011902721

(51) Int. Cl.
*B29C 35/02* (2006.01)
*B29C 70/42* (2006.01)
(Continued)

(52) U.S. Cl.
CPC .............. *F41H 1/00* (2013.01); *B29C 35/0227* (2013.01); *B32B 37/10* (2013.01); *B32B 41/00* (2013.01);
(Continued)

(58) Field of Classification Search
CPC ........ B29C 70/40; B29C 70/42; B29C 70/44; B29C 43/3642; B29C 43/12; B29C 70/46; B29C 70/48; B29C 43/146; B29C 70/443; B32B 37/10; B32B 37/1009; B32B 2309/12; B32B 2571/02; F41H 1/00
USPC .................. 425/405.1, 405.2, 387.1; 264/511
See application file for complete search history.

(56) References Cited

U.S. PATENT DOCUMENTS 2,422,999 A * 6/1947 Bagley, Jr. ..................... 264/548
2,440,499 A * 4/1948 Ames et al. ................ 425/387.1
(Continued)

FOREIGN PATENT DOCUMENTS

| EP | 0297027 B1 | 8/1991 |
| WO | 02/058918 A2 | 8/2002 |
| WO | 2008/096167 A1 | 8/2008 |

OTHER PUBLICATIONS

International Search Report issued in connection with PCT/AU2012/000820.
(Continued)

*Primary Examiner* — Yogendra Gupta
*Assistant Examiner* — Emmanuel S Luk
(74) *Attorney, Agent, or Firm* — Akerman LLP

(57) ABSTRACT

A method and apparatus for manufacturing composite articles such as laminate ballistic protection and structural reinforcements. The method involves placing a composite assembly in a sealable membrane system, e.g. a vacuum bag and placing the vacuum bag in a pressure vessel to apply heat and pressure to the composite assembly, thereby manufacturing a composite article. The apparatus comprises: a pressure vessel; a source of processing liquid to apply isostatic pressure to the vacuum bag; processing liquid heating, cooling, pressurizing and circulating means; and a control system to control the heating, cooling and pressurizing means. The sealable membrane system may preferably comprise: a sealable membrane to separate the composite article from the processing liquid and maintain the composite article below atmospheric pressure; and a membrane to cushion the composite article and resist adhesion of the article to other membranes. The processing liquid is preferably silicone oil.

10 Claims, 11 Drawing Sheets

(51) Int. Cl.
*F41H 1/00* (2006.01)
*B32B 37/10* (2006.01)
*B32B 41/00* (2006.01)
*B29C 70/44* (2006.01)
*B29C 43/12* (2006.01)

(52) U.S. Cl.
CPC ............... B29C 70/44 (2013.01); B29C 43/12 (2013.01); *B32B 37/1009* (2013.01); *B32B 2309/12* (2013.01); *B32B 2571/02* (2013.01)
USPC ...................... 425/387.1; 264/511; 425/405.1

(56) References Cited

U.S. PATENT DOCUMENTS

| | | | | |
|---|---|---|---|---|
| 3,559,236 A | * | 2/1971 | Merritt | 425/89 |
| 3,935,045 A | * | 1/1976 | Wolfe | 156/96 |
| 4,027,543 A | * | 6/1977 | Johnston | 474/271 |
| 4,264,556 A | * | 4/1981 | Kumar et al. | 264/314 |
| 4,770,835 A | * | 9/1988 | Kromrey | 264/257 |
| 4,855,011 A | * | 8/1989 | Legge et al. | 156/583.1 |
| 4,915,896 A | * | 4/1990 | Rachal et al. | 264/511 |
| 4,997,511 A | * | 3/1991 | Newsom | 156/382 |
| 5,051,226 A | | 9/1991 | Brustad et al. | |
| 5,062,780 A | * | 11/1991 | Nakagaki | 425/39 |
| 5,215,448 A | * | 6/1993 | Cooper | 417/423.5 |
| 5,366,684 A | * | 11/1994 | Corneau, Jr. | 264/510 |
| 5,643,522 A | | 7/1997 | Park | |
| 5,795,536 A | * | 8/1998 | Gaworowski et al. | 264/571 |
| 6,257,866 B1 | * | 7/2001 | Fritz et al. | 425/387.1 |
| 6,946,360 B2 | * | 9/2005 | Chou | 438/455 |
| 8,211,339 B2 | * | 7/2012 | Inston | 264/40.6 |
| 2002/0192327 A1 | * | 12/2002 | Amnered et al. | 425/384 |
| 2003/0059490 A1 | * | 3/2003 | Moore, Jr. | 425/2 |
| 2004/0113315 A1 | * | 6/2004 | Graham | 264/266 |
| 2013/0161850 A1 | * | 6/2013 | Harris et al. | 264/40.1 |
| 2013/0313760 A1 | * | 11/2013 | Kondo et al. | 264/500 |

OTHER PUBLICATIONS

International Preliminary Report on Patentability issued in connection with PCT/AU2012/000820.

Written Opinion of the International Preliminary Examining Authority issued in connection with PCT/AU2012/000820 dated Jun. 21, 2013.

Written Opinion of the International Preliminary Examining Authority issued in connection with PCT/AU2012/000820 dated Sep. 7, 2012.

* cited by examiner

PROCESS FOR THE MANUFACTURE OF MULTILAYER ARTICLES

This application is a national phase of PCT/AU2012/000820, filed Jul. 6, 2012, and claims priority to AU 2011902721, filed Jul. 8, 2011, the entire contents of both of which are hereby incorporated by reference.

The present invention relates to the manufacturing process of composite articles. The composite articles are constructed from a multilayer stack of materials that are consolidated through the application of concurrent pressure and thermal cycling. The composite articles may provide ballistic protection and or structural reinforcement, with the multilayer stack including, but not limited to, monolithic ceramics, adhesive membranes and monolayers containing reinforcing fibres and matrix material.

BACKGROUND OF THE INVENTION

Articles resilient to projectiles, commonly referred to as armour, are constructed from specialised materials using various methods to impede perforation by projectiles such as bullets and fragments.

Articles of ballistic personal protective equipment (PPE), commonly referred to as body armour, include helmets and vests that contain 'soft' flexible armour inserts and 'hard' rigid armour inserts: Armour is also used to protect occupants and equipment in land, sea and air vehicles.

Rigid armour inserts, known as Small Arms Protective Inserts (SAPIs), are engineered to protect against high-velocity rifle projectiles and share similarities in materials used and construction techniques with helmets and vehicle armour. Whilst SAPIs are available in many levels of protection, two basic configurations exist.

The first is a 100% fibre based composite SAPI designed to protect against 'soft' lead filled Full Metal Jacket (FMJ) projectiles (an example of this is USA NIJ 0101.04 level III—6 strikes of 7.62×51 mm NATO FMJ). The second is a layered SAPI containing a ceramic strike-face to protect against Armour Piercing (AP) projectiles that contain 'hard' penetrators (an example of this is USA NIJ 0101.04 level IV—1 strike of 30.06 M2 AP).

100% fibre based composite SAPIs can be manufactured from material such as para-aramid (for example Kevlar® or Twaron®) or ultra high molecular weight polyethylene (UHMWPE) when combined with a suitable resin matrix system. Materials are commercially available pre-impregnated (often referred to as 'pre-preg') with resin matrix (such as Dyneema® HB products and Spectra Shield®) to simplify this stage.

A traditional 100% fibre based composite SAPI manufacturing technique is commonly referred to as 'high-pressure axial pressing' requiring 'pre-preg' material, such as Dyneema® HB product, to be cut into the desired shape and stacked. The stack is then positioned between a matching pair of metallic dies attached within the axial press and compressed concurrently with the application of heat (from electric heating elements or the circulation of hot oil through the metallic dies) to comply with predetermined pressure and thermal cycles. Compression is halted only once the material has cooled sufficiently. If desired, the SAPI is covered using a fabric, adhered with contact adhesive.

It is known that for this type of armour, consolidation under higher pressure equates to higher ballistic performance. DSM, manufacturers of Dyneema® HB products, specify that their material must be consolidated with an axial pressure of at least 180 bar, but preferably 350 bar for a performance increase of approximately 10%. This means that to make a single 10"×12" SAPI, at least a 140 ton press, but preferably a 270 ton press is required. Thus, if a square meter of armour is required, a 3,570 ton press is needed to consolidate the material at 350 bar. Such presses are expensive and uncommon. Since presses exert pressure in an axial manner, consolidating articles shaped other than flat generate pressure gradients and inconsistent levels of consolidation. Flatter shapes minimise this effect, however items like helmets suffer greatly from uneven consolidation.

Air entrapment within axially pressed SAPIs is an issue. It is common to require between 50-200 'pre-preg' plies to manufacture a SAPI that meets USA NIJ 0101.04 level III standard. When the 'pre-preg' is stacked and pressed, air is trapped between the layers and compressed, only to appear as bubbles that indicate areas of delamination when removed from the press. To counter this, pressure must be ramped up incrementally, however this is not ideal and extends cycle time.

A major cost associated with conventionally pressing SAPIs is tooling. Rigid metallic matched die sets are required for all geometries to be manufactured. If a press is large enough to process multiple SAPIs, then multiple tooling sets are required. In addition to the die sets, cooling and heating platens are also required. The production speed for this type of SAPI is slow, since the material has to reach a consistent temperature throughout but not have localised 'hot spots' that would permanently damage the material. A typical cycle time is approximately 45 minutes per USA NIJ 0101.04 level III standard SAPI.

A traditional method of manufacturing a layered SAPI containing a ceramic strike-face is to bond a monolithic ceramic tile to the front face of an axially pressed 100% fibre based composite. 'backing'. A resin or elastomeric compound is usually used as the adhesive material and the assembly is clamped whilst curing in an evacuated bag. The evacuated bag provides an even clamping force of near atmospheric pressure. If desired, the layered SAPI is covered using a fabric, adhered with contact adhesive.

This type of layered SAPI is time consuming to manufacture and can suffer significant through-thickness inconsistency. Typically all kiln fired ceramics exhibit warping, in some circumstances by more than 3 mm. Since the 100% fibre based composite 'backing' is shaped by precision machined dies and flexes minimally, the discrepancy in geometry between the ceramic tile and the 'backing' is filled by excess bonding adhesive. This adds weight and reduces ballistic performance.

Another traditional method of manufacturing a layered SAPI is a batch-type process that employs an autoclave. Industrial autoclaves are pressure vessels used to process parts and materials which require exposure to elevated pressure and temperature. Typically a stack of 'pre-preg' material is placed behind a ceramic tile with an intervening layer of adhesive film or composite. The assembly is then wrapped with a plastic release film and placed in a heat sealable vacuum bag. The bag is then evacuated and sealed. This process overcomes the air entrapment issues encountered during axial pressing and clamps the assembly together to allow handling without any alignment shift. The filled vacuum bags are loaded within an autoclave, which is pressurised, typically 6 to 20 bars, using air or an inert gas and heated to comply with predetermined pressure and thermal cycles. Following sufficient time at elevated temperature, the autoclave is cooled whilst maintaining pressure. Pressure is released when the temperature has reduced adequately. If desired, the layered SAPI is covered using a fabric, adhered with contact adhesive.

The major deficiency of this procedure is low composite consolidation pressure. Autoclaves are pneumatic (gas filled) rather than hydraulic (liquid filled) devices, and are subjected to stringent safety regulations. The typical working pressures that autoclaves use generally range from 6-20 bar, which is well below the minimal (180 bar) and desired (350 bar) consolidation pressures suggested by DSM, manufacturers of Dyneema® HB products. To compensate for this low-pressure consolidation, extra composite is used to achieve ballistic performance; however this increases cost, weight and thickness.

OBJECT OF THE INVENTION

It is an object of the present invention to overcome, or at least substantially ameliorate, the disadvantages and shortcomings of the prior art.

A further object of the invention is to decrease production time of composite articles.

A further object of the invention is to increase composite article efficacy through enhanced ballistic performance and/or reduced weight.

SUMMARY OF THE INVENTION

According to the embodiments of the present invention, although this should not be seen as limiting the invention in any way, there is provided a programmable system and/or methods of exercising pressure and thermal cycling for the purpose of composite article consolidation, the system (apparatus) including:
- a processing fluid contained within a closed processing liquid filled circuit;
- a composite article processing volume having:
  - an opening to facilitate loading and unloading;
  - processing liquid circulation processing porting to allow the inward and outward passage of processing fluid within the closed processing liquid filled circuit.
- a processing fluid pressurisation system having means to increase or decrease pressure within the closed processing fluid filled circuit;
- an external processing fluid circulation system fluidly connected to the closed processing liquid filled circuit;
- an external processing fluid heating system fluidly connected to the closed processing liquid filled circuit;
- an external processing fluid cooling system fluidly connected to the closed processing liquid filled circuit;
- a process control system including:
  - means to control the processing fluid heating system and the processing fluid cooling system;
  - means to control the processing fluid pressurisation system;
- a composite article preparation system including:
  - a sealable membrane to separate the composite article and the processing fluid;
  - a sealable membrane to maintain the composite article in a pressure below atmospheric pressure prior to the application of external processing fluid pressure;
  - a membrane to cushion the composite article;
  - a membrane to resist adhesion of other membranes to the external surface of the composite article;

In preference, the processing fluid circulation system includes a circulation device to circulate processing fluid at elevated pressure.

In preference, the processing fluid heater system includes a heating device to heat the processing fluid.

In preference, the processing fluid cooling system includes a cooling device to cool the processing fluid.

In preference, the processing fluid is silicone oil.

In preference, the composite article processing volume is a metallic structure.

In preference, the composite article processing volume is cylindrical with an opening at one end.

In preference, the processing fluid pressurisation system utilizes hydraulic-over-hydraulic or air-over-hydraulic pumping technology.

In preference, the processing fluid circulation system utilizes hydraulic-over-hydraulic or air-over-hydraulic pumping technology.

In preference, the processing fluid heater system uses electric resistive elements shielded from high pressure by metallic tubing.

In preference, the processing fluid cooling system is an assembly largely of finned metallic tubing.

In preference, the fluid is a liquid.

In preference, the sealable membrane that isolates the composite article from processing fluid is the sealable membrane that maintains the composite article in a pressure below atmospheric prior to the application of external processing fluid pressure; and is a heat-sealable plastic bag.

In preference, the membrane that cushions the composite article is the membrane that opposes unwanted adhesion to the composite article, and is silicone sheeting or polytetrafluoroethylene coated material.

The present invention can also be used to consolidate finished or green-body composite articles from mixtures or slurries. Finished articles are bound by a matrix that acts to bond reinforcements such as particles, fibres and nanotubes following pressure and thermal cycling. Green-body composites are bound by a matrix following pressure and thermal cycling with sufficient strength to allow additional processing such as high-temperature sintering.

BRIEF DESCRIPTION OF THE DRAWINGS

The accompanying drawings, which are incorporated into and constitute part of this specification, illustrate one or more embodiments and, together with the description of the invention, serve to explain the principles and implementations of the invention. In the drawings.

DESCRIPTION OF THE INVENTION

Embodiments are described herein in the context of a process for the manufacture of composite articles. Those of ordinary skill in the art will realise that the following detailed description is illustrative only and is not intended to be in any way limiting. Other embodiments of the present invention will readily suggest themselves to such skilled persons having the benefit of this disclosure. Reference will now be made in detail to implementations of embodiments of the present invention as illustrated in the accompanying drawings. The same reference indicators will be used throughout the drawings and the following detailed description to refer to the same or like parts.

General Description of the Inventive System and Process

Figure 1:
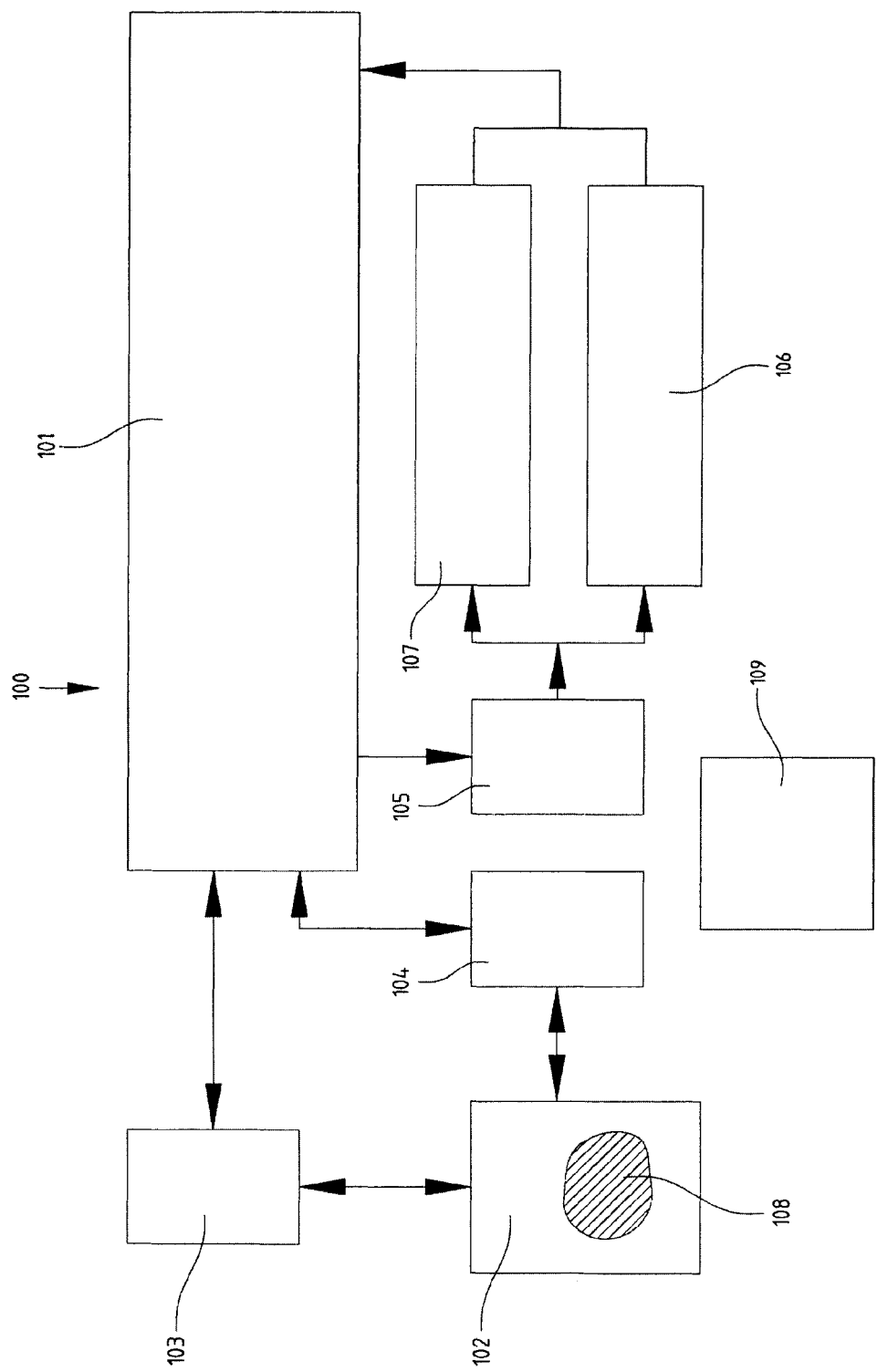
FIG. 1. illustrates a basic block diagram for the inventive composite article manufacturing system.

FIG. 1 illustrates a basic block diagram for the inventive composite article manufacturing system, generally numbered 100, including a composite article processing volume 101, a processing liquid storage tank 102, a processing liquid transfer pump system 103, a processing liquid pressurisation system 104, a processing liquid circulation system 105, a processing liquid heating system 106, a processing liquid cooling system 107, a processing liquid 108 and a process control system 109.

Figure 2:
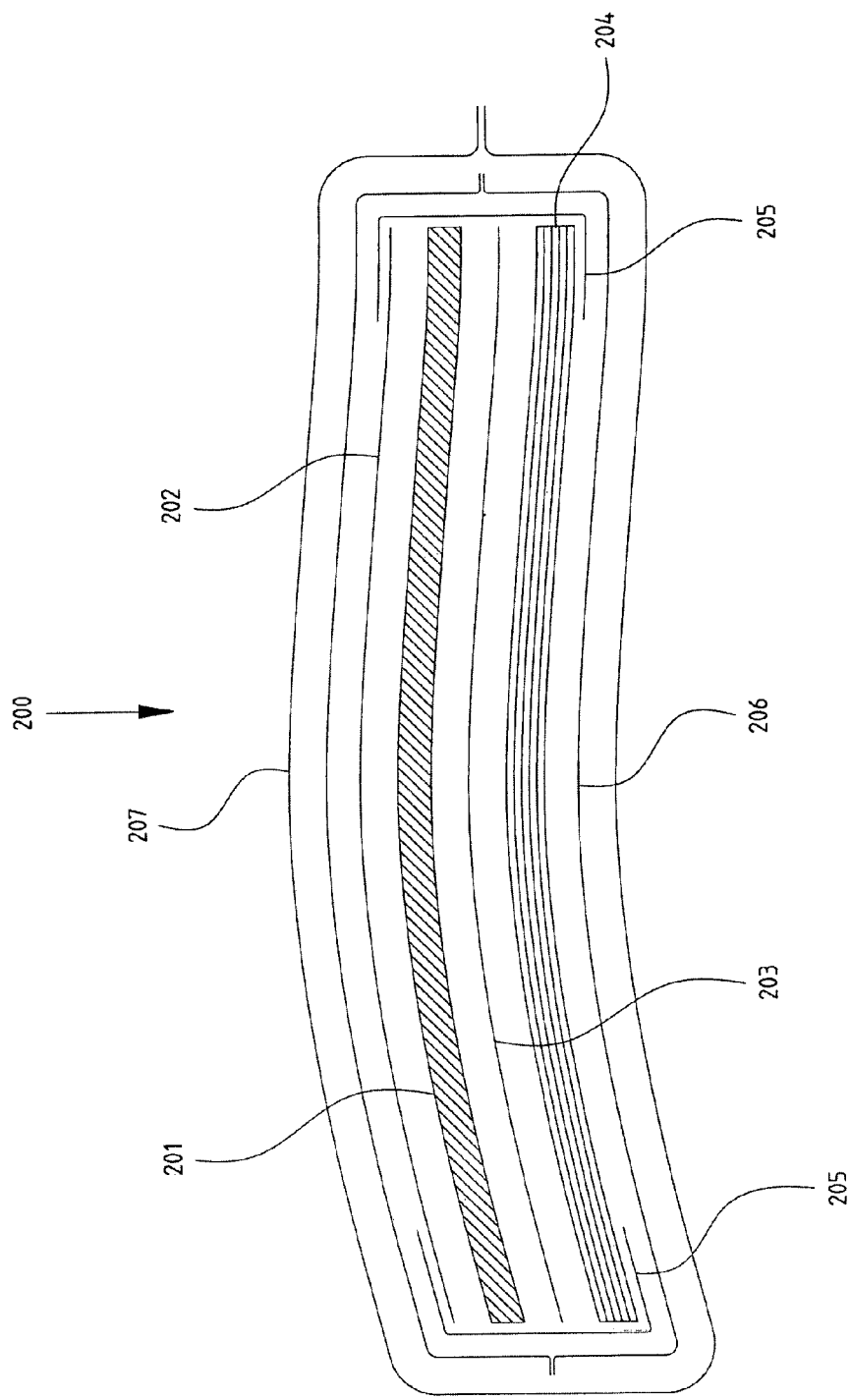
FIG. 2. illustrates a composition of raw materials assembled to manufacture a Small Arms Protective Insert (SAPI).

To manufacture a Small Arms Protective Insert (SAPI), a composition of raw materials is assembled as illustrated in FIG. 2, generically numbered 200. The assembly of raw materials 200 could typically contain, but is not limited to, a monolithic ceramic tile 201, one or more layers of resin pre-impregnated (pre-preg) fibres 202 positioned forward of the monolithic ceramic tile 201, one or more layers of pre-preg fibres or an adhesive film 203 positioned behind on the ceramic 201 and in front of a substantial stack of backing layers of pre-preg fibres 204. The layers of materials are rigidly connected temporarily with adhesive tape 205 or hot-melt adhesive. Surrounding the connected stack of materials is a membrane of stretched, coloured, porous covering fabric 206. Surrounding the covering fabric 206 is a layer of sealing membrane 207.

Within a SAPI the hard, frangible monolithic ceramic tile 201 functions to fragment and erode projectiles upon impact. Typical ceramic materials include Silicone Carbide, Boron Carbide and Aluminium Oxide. The one or more layers of pre-preg fibres 202 positioned forward on the ceramic function as a spall-face to support and retain the monolithic ceramic tile 201 during and after projectile impact. Typical spall-face materials include epoxy or phenolic resin reinforced para-aramid or glass fibres.

The one or more layers of pre-preg fibres 203, referred to as a stiffening membrane, or an adhesive film 203 positioned behind the monolithic ceramic tile 201, function to thoroughly bond the substantial stack of backing 204 to the monolithic ceramic tile 201. Typical thin film adhesives include polyurethanes and polyolefins, and typical stiffening membranes include epoxy or phenolic resin reinforced para-aramid, glass or carbon fibres.

The membrane of stretched, coloured, porous covering fabric 206 functions as a SAPI covering. It can be applied by stretching, clamping and heat-fusing front and rear membranes around the circumference of the SAPI. Stretching the covering 206 during application minimises weight and ensures geometric conformity. Typical materials for the covering 206 include fabrics comprised of nylon (90%) and elastane (10%). The layer of adhesive film 207 functions to bond and seal the covering fabric 206 to the layers of materials temporarily rigidly connected with adhesive tape 205. The sealing membrane 207 is selected to be compatible with the specific concurrent pressure and thermal cycling of the process and to provide the desired environmental protection to the SAPI. Typical sealing membranes include polyurethanes and polyolefins.

Figure 3:
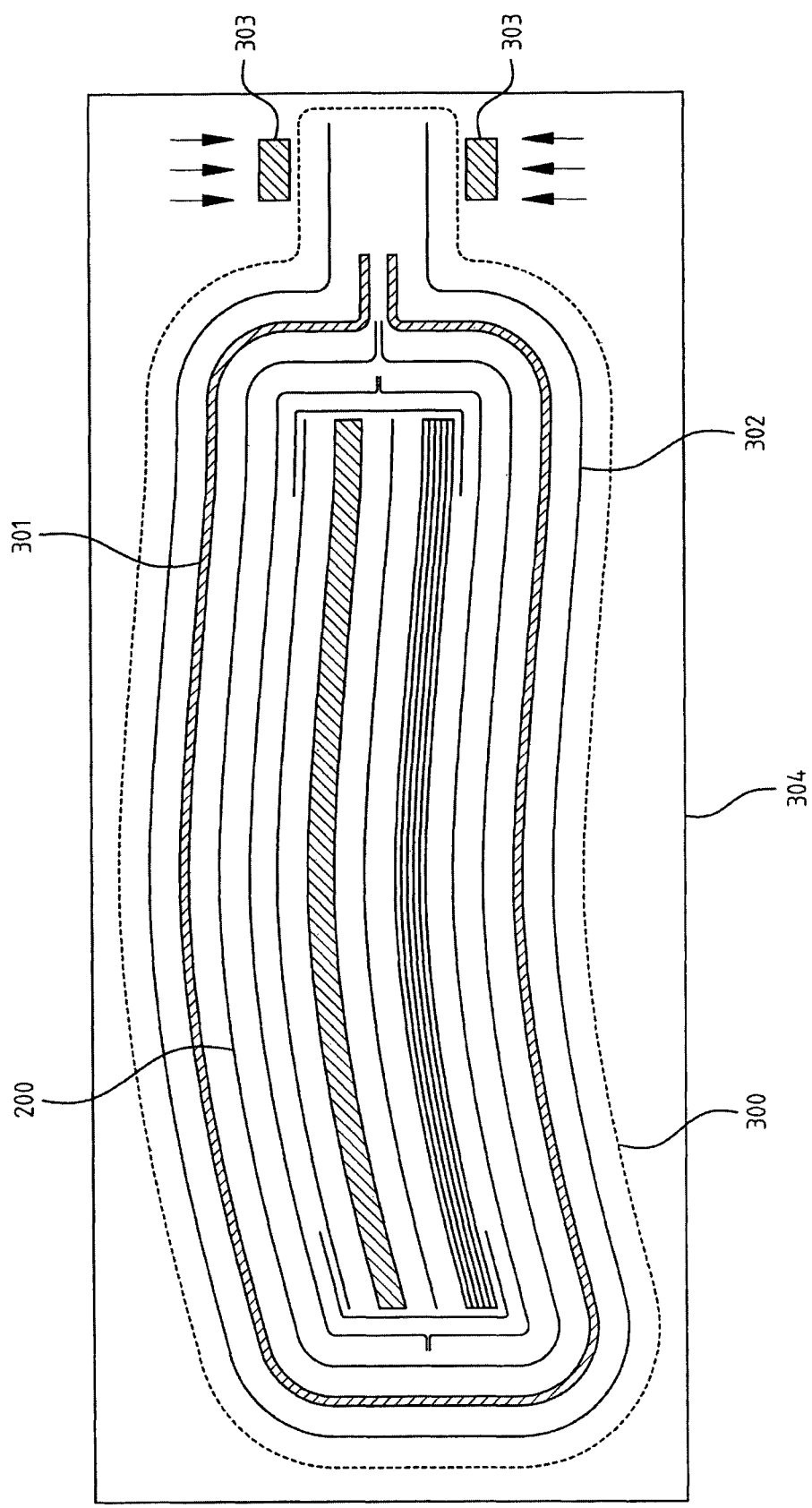
FIG. 3. illustrates a composition of raw materials prepared to manufacture a Small Arms Protective Insert (SAPI).

Prior to processing a SAPI the assembly of raw materials 200 is prepared as illustrated in FIG. 3. The assembly of raw materials 200 is placed within a plastic bag 302 that is lined with a silicone membrane 301. The silicone membrane 301 functions to cushion and protect the plastic bag 302 from the assembly of raw materials 200 and oppose adhesion of the layer of adhesive film 207 to the plastic bag 302. The plastic bag 302 is then placed within a vacuum chamber 304 that contains heat-sealing bars 303. The chamber 304 is evacuated and after a period of time the plastic bag 302 is sealed by the heat-sealing bars 303.

The chamber 304 is then equalised to atmospheric pressure and the sealed plastic bag 302 removed. This method of preparing the assembly of raw materials 200 for processing removes atmosphere from within the plastic bag 302 and allows assembly of raw materials 200 without compression of the outer surfaces of the plastic bag 302 that limits the efficiency of atmosphere removal. The removal of atmosphere from within the plastic bag 302 is essential to achieve effective consolidation during processing. The plastic bag 302 is sealed to isolate the assembly of raw materials 200 from processing liquid 108 and maintains the removal of atmosphere from within the plastic bag 302.

Processing a SAPI occurs in the inventive composite article manufacturing system, generally numbered 100. The closed plastic bag 302 is positioned within the processing volume 101 that is subsequently sealed. Processing liquid 108 is transferred from the processing liquid storage tank 102 by the processing liquid transfer pump system 103 to fill the composite article processing volume 101, processing liquid heating system 106, processing liquid cooling system 107, processing liquid pressurisation system 104, processing liquid circulation system 105 and all associated piping.

The processing liquid storage tank 102 and processing liquid transfer pump system 103 are then isolated allowing the processing liquid pressurisation system 104, controlled by the process control system 109, to increase processing liquid 108 ambient pressure, typically to 100 bar. The processing liquid circulation system 105 is then activated to circulate the pressurised processing liquid 108 through the composite article processing volume 101 and processing liquid heating system 106. The processing liquid heating system 106 is then activated and controlled by the process control system 109 to attain and maintain a desired processing liquid 108 temperature, typically 125° C. The processing liquid pressurisation system 104 accounts for thermal expansion of the processing liquid 108. Following thermal heating and dwell periods, the process control system 109 switches processing liquid 108 circulation to include the processing liquid cooling system 107 and exclude the processing liquid heating system 106.

The processing liquid pressurisation system 104 accounts for thermal contraction of the processing liquid 108. The process control system 109 stops the processing liquid circulation system 105 when processing liquid 108 has reduced to a desired temperature, typically 45° C., and then controls the processing liquid pressurisation system 104 to reduce processing liquid 108 ambient pressure to atmospheric pressure. The processing liquid storage tank 102 and processing liquid transfer pump system 103 are connected and the processing liquid transfer pump system 103 used to transfer all processing liquid 108 to the processing liquid storage tank 102. The processing volume 101 is opened and the sealed plastic bag 302 removed, opened and the contents removed. The silicone membrane 301 is separated from the assembly of raw materials 200, now a finished, SAPI, consolidated by the concurrent pressure and thermal cycling.

The processing liquid 108 is a medium that has minimal compressibility, minimal toxicity and reactiveness, high boiling point, practical viscosity and high thermal conductivity. The composite article manufacturing system, generally numbered 100, employs non-reactive polydimethylsiloxane (silicone oil) as the processing liquid 108, sourced as 'WACKER® AK100' from Wacker Chemie AG, Germany. 'WACKER® AK100' is a clear, odourless and colourless liquid with a viscosity of approximately 100 mm$^2$/s to room temperature and a flash point exceeding 275° C. (ISO 2592). The manufacturer's Australian MSDS specifies the material as a non-hazardous substance (according to the criteria of NOHSC) and a non-dangerous good (according to the ADG Code). 'WACKER® AK100' has been found to provide almost no lubricity and suffer a substantial reduction in viscosity at elevated temperature.

Figure 4:
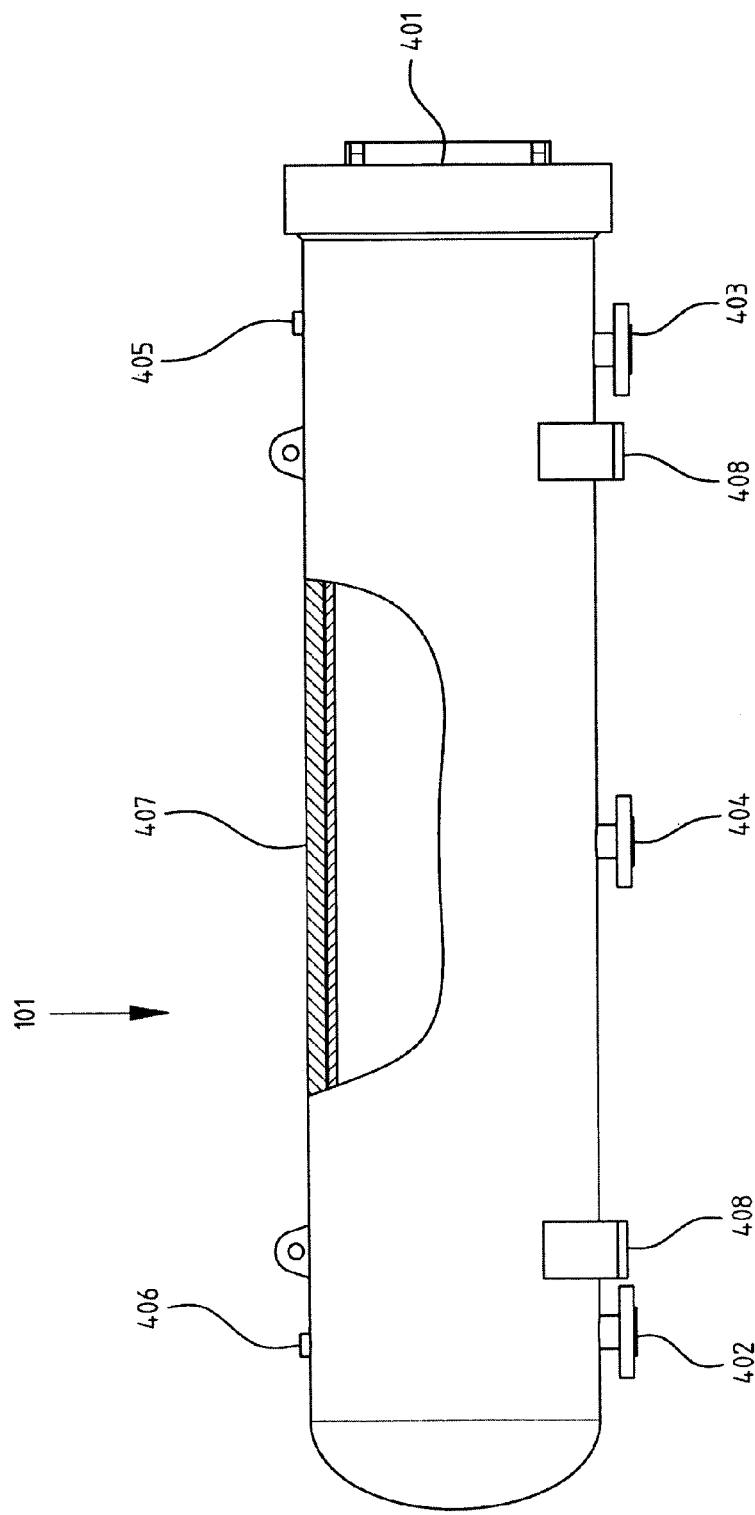
FIG. 4. illustrates a composite article processing volume.

The composite article processing volume 101, illustrated in FIG. 4, is a pressure vessel capable of withstanding an internal pressure at elevated temperature, practically shaped with an opening to facilitate loading and unloading. The composite article manufacturing system, generally numbered 100, employs a composite article processing volume 101 of welded metallic construction that is engineered to function with a safe maximum operating internal pressure of 100 bar and a maximum operating temperature of 150° C.

The composite article processing volume 101 must be engineered in a manner compliant with relevant standards, in Australia AS1210. Preferably, the composite article processing volume 101 is cylindrical with tubular length substantially longer than diameter, orientated with tubular length horizontal and physically constrained with structural supports 408.

The composite article processing volume 101 has an opening 401 at one end of the cylindrical section that is manually operated and when opened provides unrestricted access to the full internal diameter. Such openings are referred to as 'quick-opening closures' within industry and are available in standard configurations. The composite article processing volume 101 has an external layer of thermal insulation 407 to minimise heat loss and maximise process efficiency. The composite article processing volume 101 has external porting for processing liquid 108 circulation inlet 402, circulation outlet 403, sensor feed-thru 404, venting for filling and emptying 405 and emergency pressure release 406.

Figure 5:
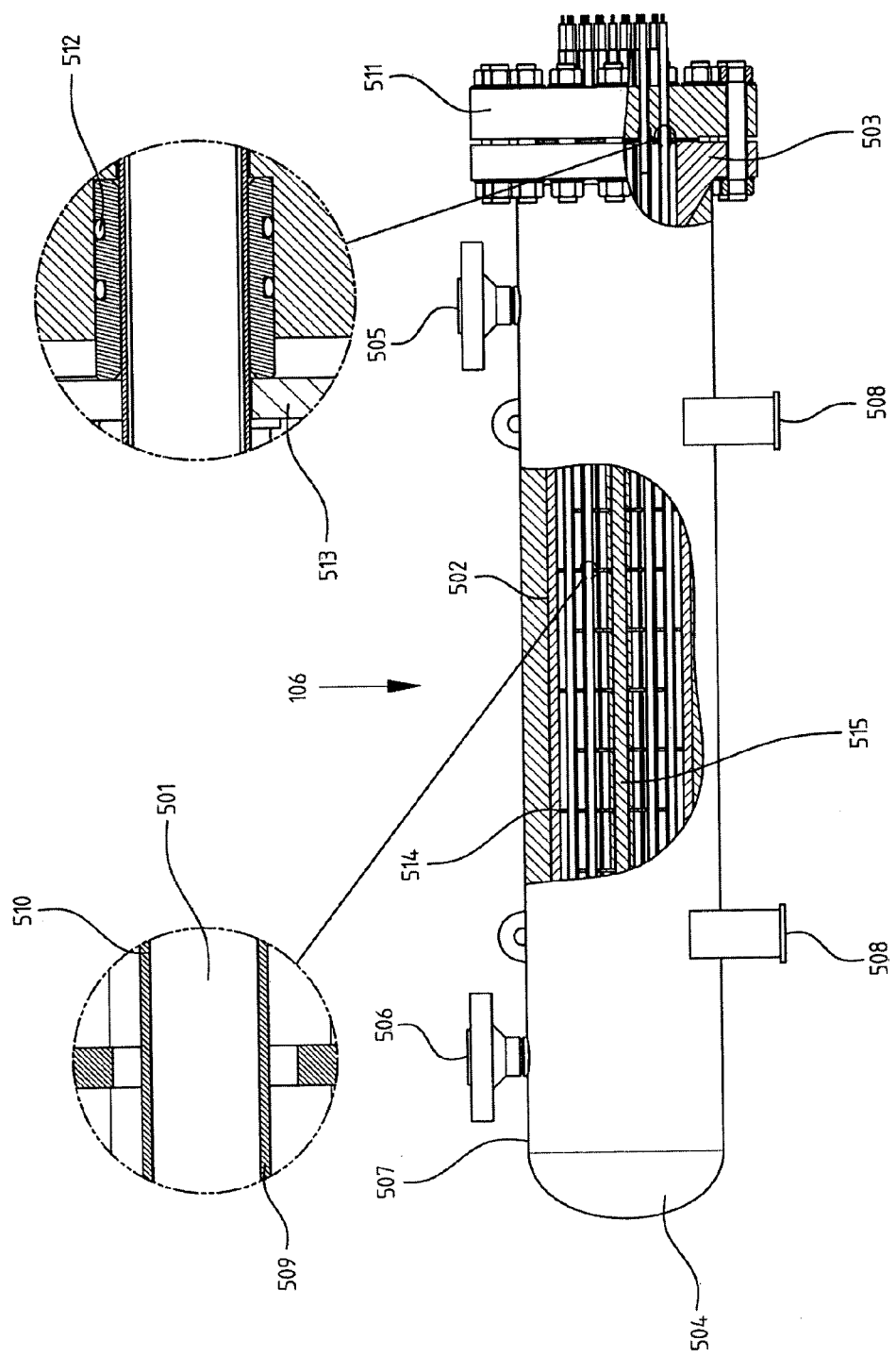
FIG. 5. illustrates a processing liquid heating system.

The processing liquid heating system 106, illustrated in FIG. 5, is an assembly of electric heater elements 501 and a pressure vessel 502 capable of withstanding an internal pressure at elevated temperature that is engineered similarly to the composite article processing volume 101. The processing liquid heating system 106 is similar to articles referred to within industry as 'flanged immersion heaters'. The pressure vessel 502 is cylindrical with tubular length substantially longer than diameter, orientated with tubular length horizontal and physically constrained with structural supports 508. The pressure vessel 502 has an open flanged end 503 and a closed end 504 and has external porting for processing liquid 108 consisting of circulation inlet 505 and circulation outlet 506. The processing liquid heating system 106 has an external layer of thermal insulation 507 to minimise heat loss and maximise process efficiency.

The assembly of electric heater elements 501 consists of many electrically resistive heater elements 501 contained within metallic tubes 509 that are attached to a flange 511 that connects to the pressure vessel 502. The metallic tubes 509 act to shield the electrically resistive heater elements 501 from pressure and are thermally coupled with a thermally conductive medium 510. The inventive system uses commercially available metallic hydraulic tubing to shield the electrically resistive heater elements 501 from pressure and a unique composite of high temperature anti-seize compound and graphite powder as the thermally conductive medium 510. The metallic tubes 509 form a seal with the flange 511 utilising multiple o-rings 512 and are secured with the retainer plate 513.

The assembly of electric heater elements 501 is additionally aligned and supported by baffles 514 spaced along the length of the assembly and secured by a rod 515 that passes through the centre of the pressure vessel 502 and is anchored to the flange 511. The baffles 514 are orientated to disturb the circulation of processing liquid 108 in operation. Industrial 'flanged immersion heaters' such as the inventive processing liquid heating system 106 are uncommon due to the high operating pressure.

Figure 6:
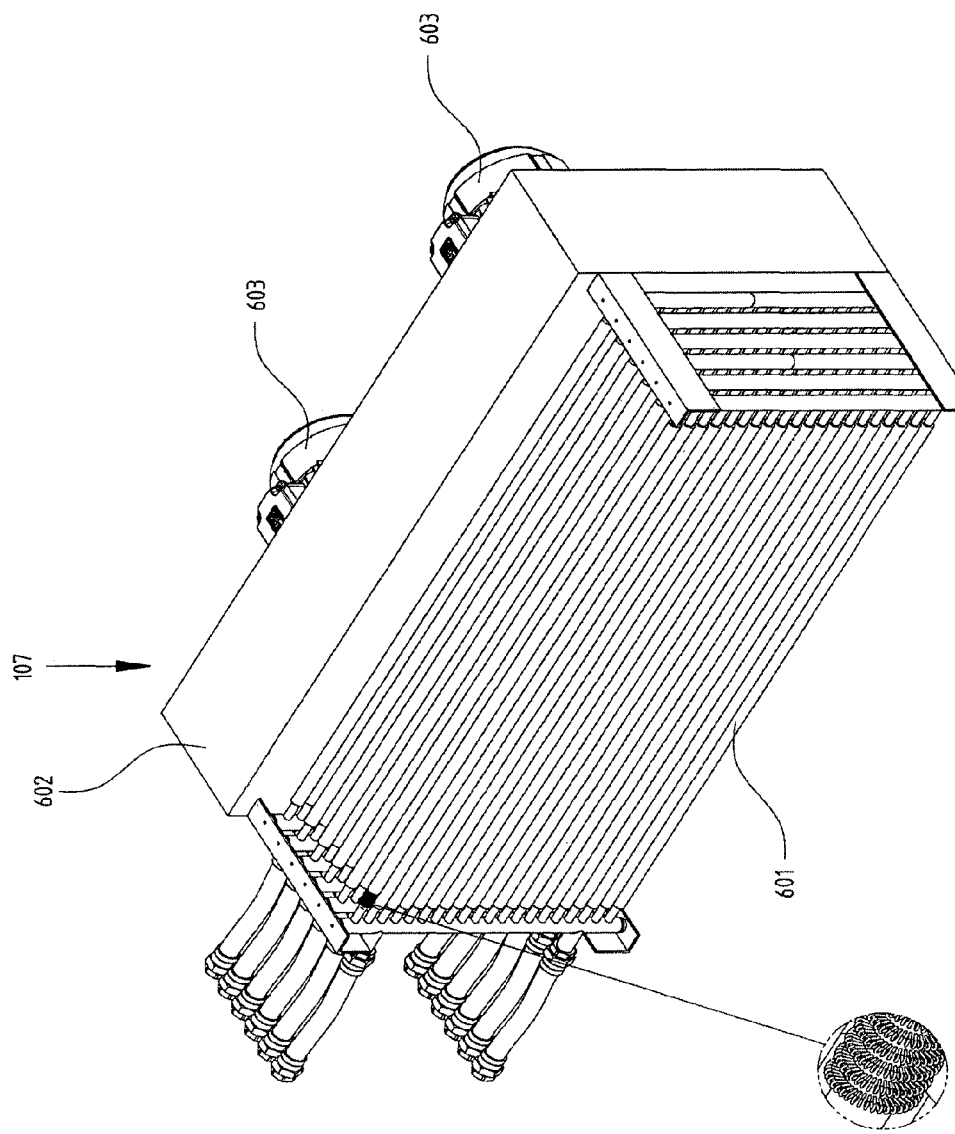
FIG. 6. illustrates a processing liquid cooling system.

The processing liquid cooling system 107, illustrated in FIG. 6, is an assembly of finned tubing 601 contained within ducting 602 that supports the cooling air flow devices 603. The assembly of finned tubing 601 can be divided into numerous groups, each plumbed in parallel, reducing the magnitude of backpressure the processing liquid cooling system 107 imposes during circulation. The finned tubing 601 is manufactured from commercially available metallic hydraulic tubing with the addition of external protrusions to increase surface area. These external protrusions may be sheet-metal discs or a wire-form, soldered to the tube to maximise heat transfer. During operation, the cooling air flow devices 603 mounted on one side of the assembly of finned tubing 601 causes a pressure gradient that forces air to pass through the processing liquid cooling system 107 and exchange heat energy. Industrial radiators such as the inventive processing liquid cooling system 107 are uncommon due to the high operating pressure.

Figure 7:
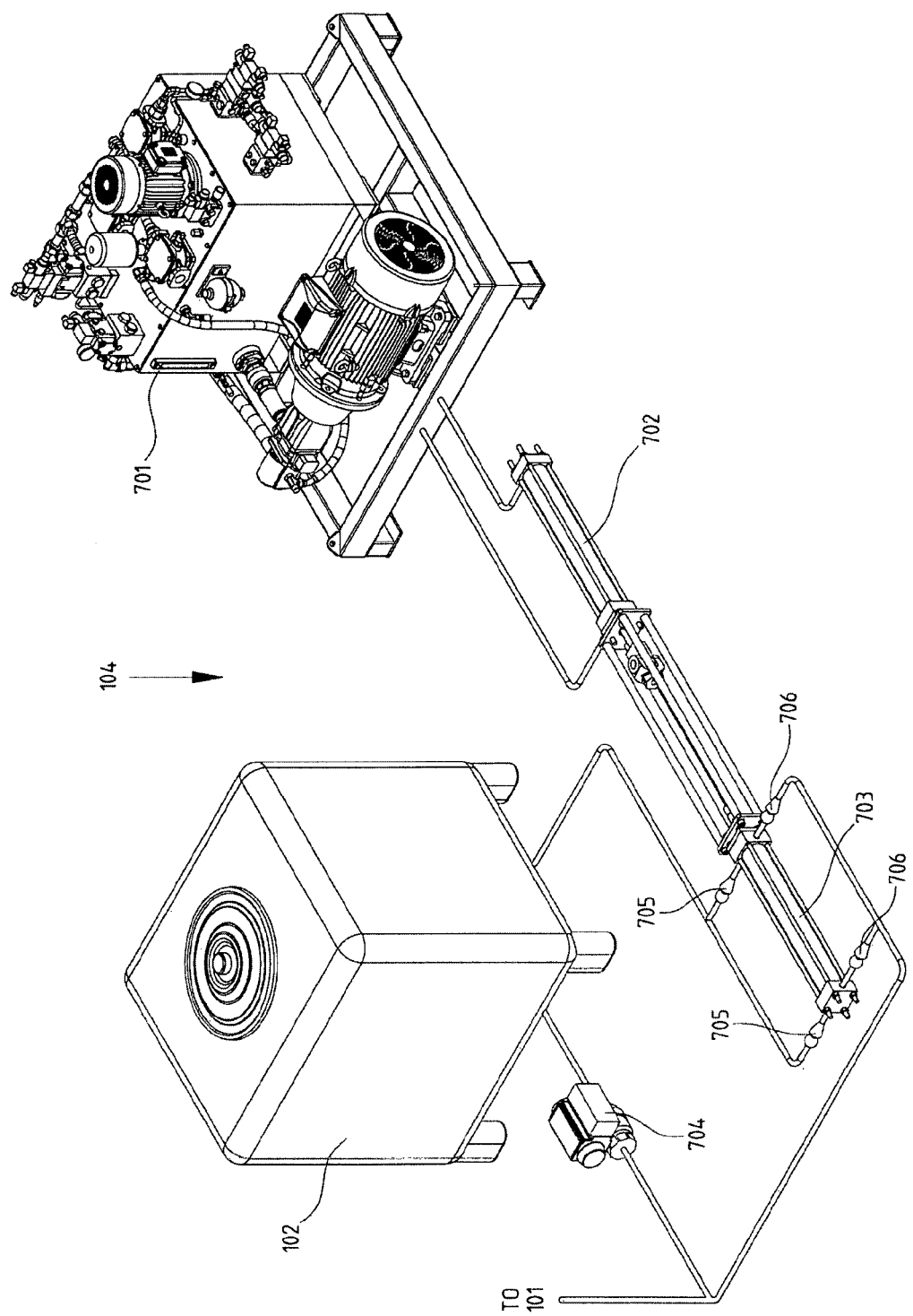
FIG. 7. illustrates a processing liquid pressurisation system.

The processing liquid pressurisation system 104, illustrated in FIG. 7, is an assembly of a hydraulic power system 701, a hydraulic driver cylinder 702, a hydraulic driven cylinder 703, a pressure release gate 704 and various valving. In operation the processing liquid pressurisation system 104 is controlled by the process control system 109, to increase or decrease ambient processing liquid 108 system pressure. When functioning to decrease ambient processing liquid 108 system pressure release gate 704 is opened and processing liquid 108 returns to the processing liquid storage tank 102. A restrictive orifice may be included to retard the rate of processing liquid 108 flow. When functioning to increase ambient processing liquid 108 system pressure the hydraulic power system 701 powers the hydraulic driver cylinder 702 which oscillates back and forth along its full stroke, controlled by a magnetic switching.

The hydraulic driver cylinder 702 ram is attached to the hydraulic driven cylinder 703 ram and mimics its action. The hydraulic driven cylinder 703 has inlet and exit porting at both cylinder ends, each governed by one-way valves. Inlet porting is coupled to the processing liquid storage tank 102 with one-way valves 705 allowing only processing liquid 108 flow from the processing liquid storage tank 102 when motion of the hydraulic driven cylinder 703 ram generates low pressure. One-way valves 705 disallow return of processing liquid 108 to the processing liquid storage tank 102. Outlet porting is coupled to the composite article processing volume 101, with one-way valves 706 allowing only flow of processing liquid 108 to the composite article processing volume 101 when motion of the hydraulic driven cylinder 703 ram generates a pressure exceeding the ambient processing liquid 108 system pressure. One-way valves 706 disallow flow of processing liquid 108 from the composite article processing volume 101.

This inventive processing liquid pressurisation system 104 isolates the processing liquid 108 from the hydraulic power system 701 and generates processing liquid 108 pressure with a 'positive displacement' pumping technique; that is, the fluid added to increase pressure is directly proportional to cylinder displacement and not a pressure differential that changes with viscosity. No parts of the processing liquid pressurisation system 104 that contact processing liquid 108 utilise rotational shaft seals or metal-on-metal bearing surfaces. This eliminates inevitable wear and seal failure problems caused by poor lubricity and substantial reductions in viscosity at elevated to temperature of the processing liquid 108 in combination with elevated pressure. Industrial fluid pressurisation systems such as the inventive processing liquid pressurisation system 104 are uncommon due to the unique requirements.

Figure 8:
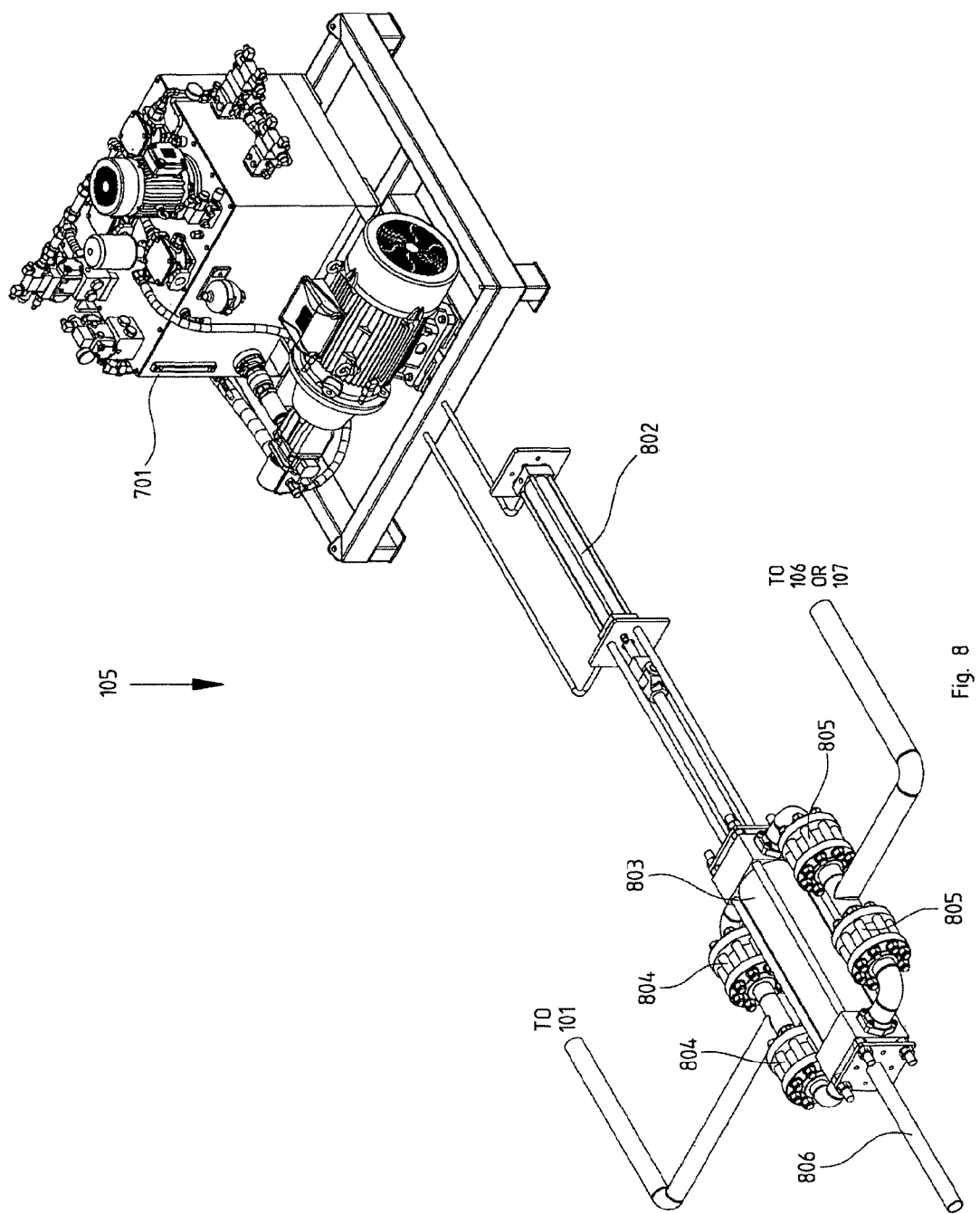
FIG. 8. illustrates a processing liquid circulation system.

The processing liquid circulation system 105, illustrated in FIG. 8, is an assembly of a hydraulic power system 701, a hydraulic driver cylinder 802, a hydraulic driven cylinder 803 and various valving. In operation the processing liquid circulation system 105 is controlled by the process control system 109 to circulate pressurised processing liquid 108. When functioning to circulate pressurised processing liquid 108 the hydraulic power system 701 powers the hydraulic driver cylinder 802 which oscillates back and forth along its full stroke, controlled by magnetic switching. The hydraulic driver cylinder 802 ram is attached to the hydraulic driven cylinder 803 ram and mimics its action. The hydraulic driver cylinder 802 has an additional ram 806 protruding from its other end to balance static pressure loading and limit the force required of the hydraulic driver cylinder 802 to a magnitude sufficient to overcome processing liquid 108 circulation backpressure and frictional sealing loads only. This makes feasible an advantageous increase in hydraulic driven cylinder 803 diameter relative to the hydraulic driver cylinder 802.

The hydraulic driven cylinder 803 has inlet and exit porting at both cylinder ends, each governed by one-way valves 804. Inlet porting is coupled to the composite article processing volume 101 with one-way valves 804 allowing only processing liquid 108 flow from the composite article processing volume 101 when motion of the hydraulic driven cylinder 803 ram generates low pressure. One-way valves 804 disallow return of processing liquid 108 to the composite article processing volume 101. Outlet porting is coupled to either the processing liquid heating system 106, or processing liquid cooling system 107, with one-way valves 804 allowing only flow of processing liquid 108 to processing liquid heating system 106, or processing liquid cooling system 107, when motion of the hydraulic driven cylinder 803 ram generates a pressure exceeding the ambient processing liquid 108 system pressure.

One-way valves 804 disallow flow of processing liquid 108 from the processing liquid heating system 106, or processing liquid cooling system 107. All seals within the hydraulic driven cylinder 803 are constructed from high-temperature material, such as viton fluoroelastomers, to ensure service at elevated process temperature and pressure. This inventive processing liquid circulation system 105 isolates the processing liquid 108 from the hydraulic power system 701 and generates processing liquid 108 circulation with a 'positive displacement' pumping technique; that is, the fluid circulation is directly proportional to cylinder displacement and not a pressure differential that changes with viscosity.

No parts of the processing liquid circulation system 105 that contact processing liquid 108 utilise rotational shaft seals or metal-on-metal bearing surfaces. This eliminates inevitable wear and seal failure problems caused by poor lubricity and substantial reductions in viscosity at elevated temperature of the processing liquid 108 in combination with elevated pressure. Industrial fluid circulation systems such as the inventive processing liquid circulation system 105 are uncommon due to the unique requirements.

Figure 9:
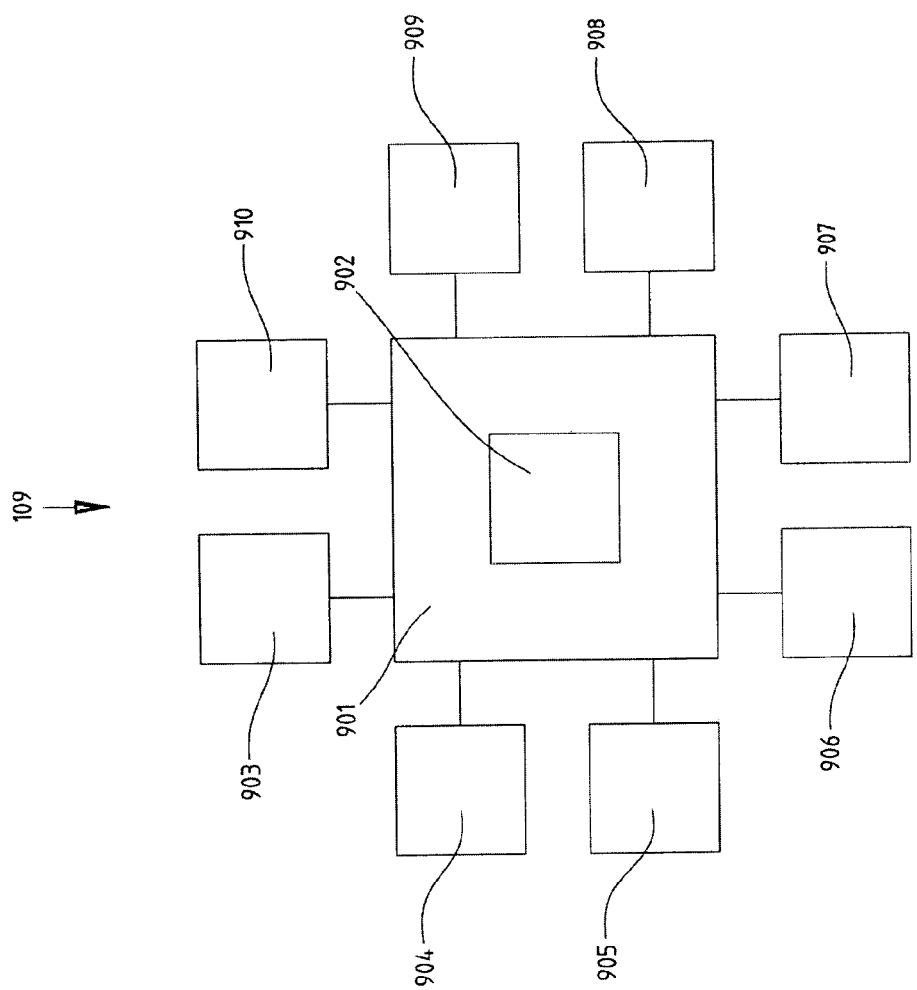
FIG. 9. illustrates a process control system.
Figure 10:
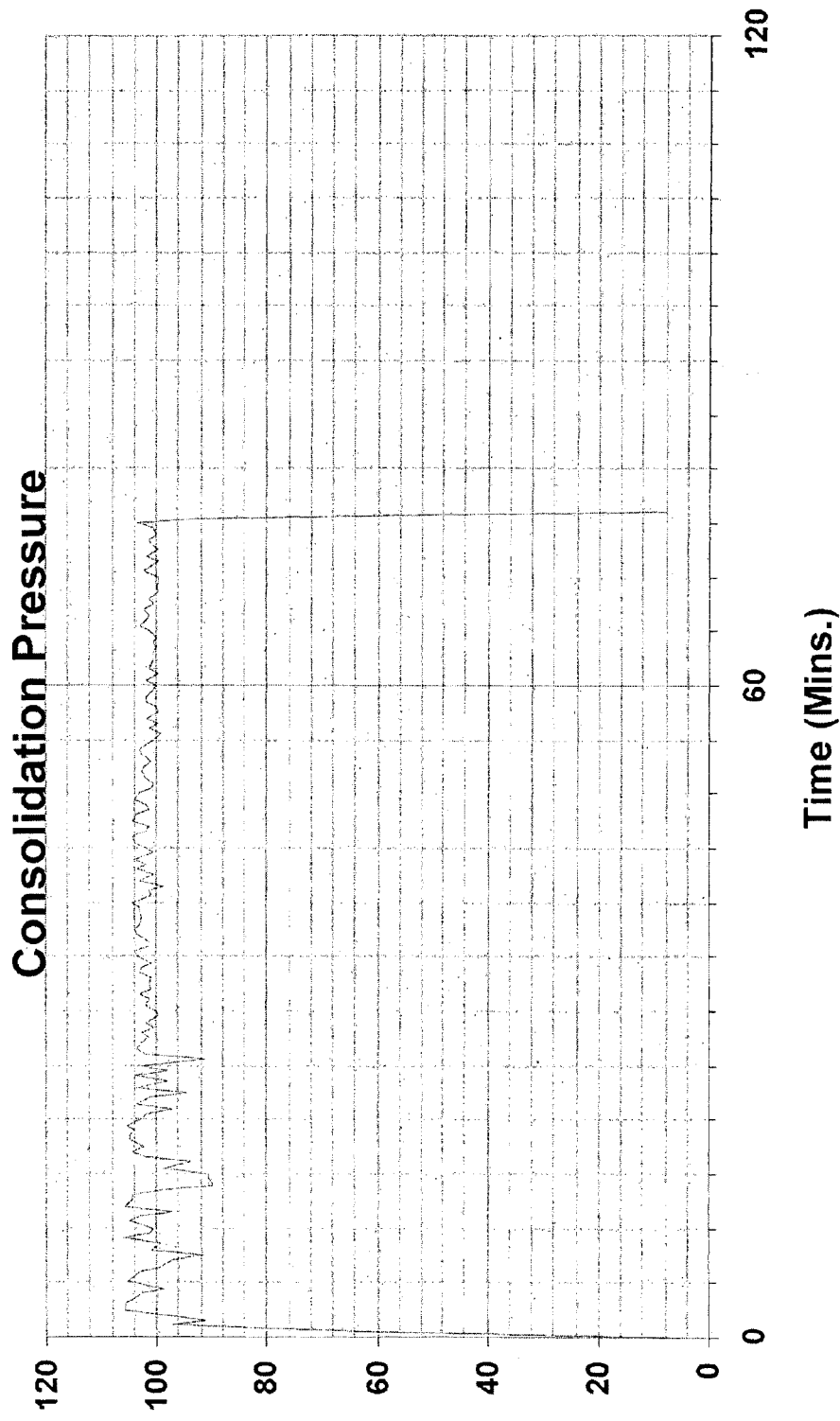
FIG. 10. illustrates a typical predetermined pressure cycle.

The process control system 109, illustrated in FIG. 9, is an assembly of thermal sensing devices 903, pressure sensing devices 904, electrical current sensing devices 905, electrical voltage sensing devices 906, fluid level sensing devices 907, valving 908, electrically operated switches 909, manually operated switches 910, control hardware 901 and software 902. In operation the process control system 109 employs closed loop pressure and thermal control to navigate predetermined pressure and thermal cycles. A typical predetermined pressure cycle is illustrated in FIG. 10, with pressure graduated on the vertical, or y-axis, and elapsed time on the horizontal, or x-axis.

Figure 11:
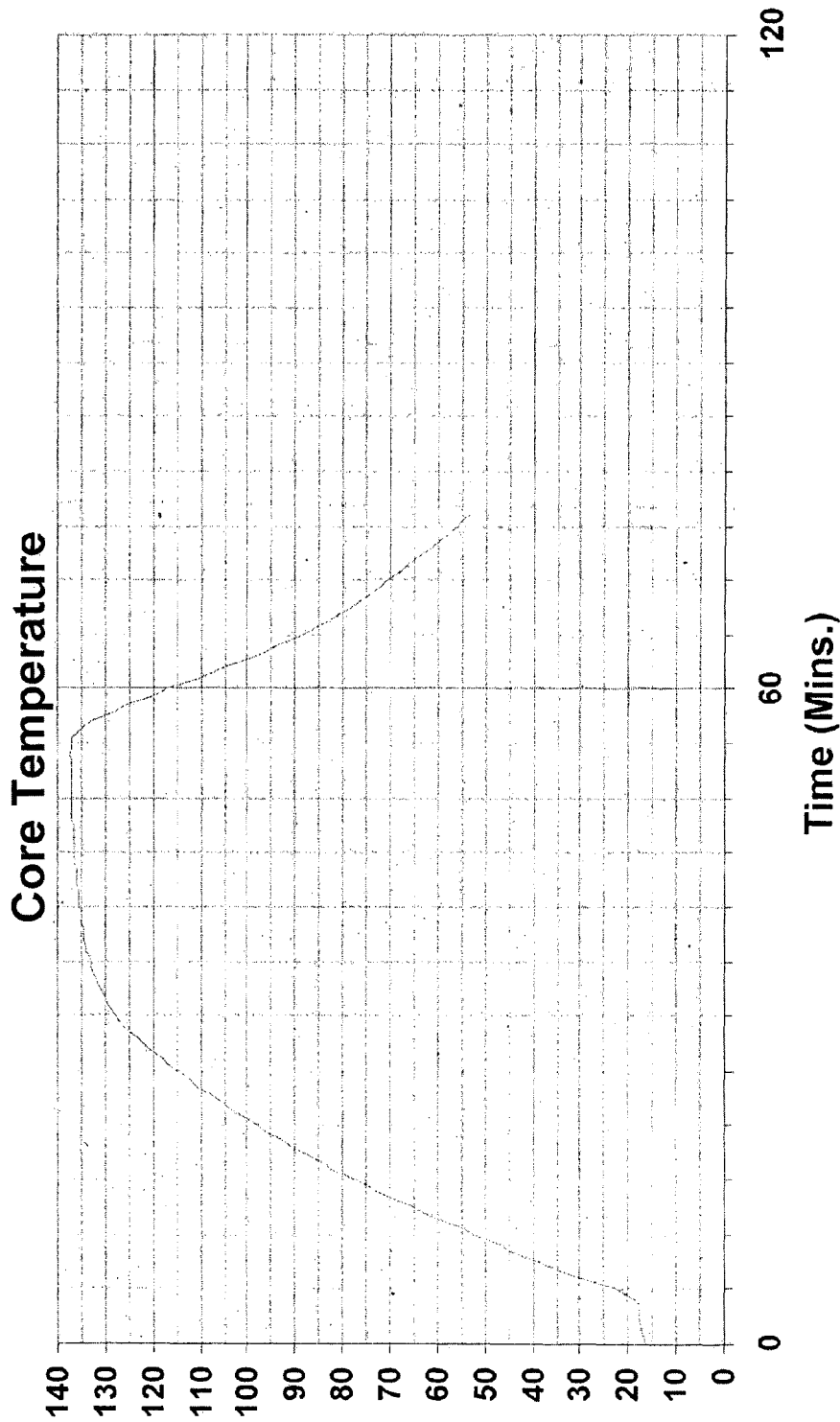
FIG. 11. illustrates a typical predetermined thermal cycle.

A typical predetermined thermal cycle is illustrated in FIG. 11, with temperature graduated on the vertical, or y-axis, and elapsed time on the horizontal, or x-axis. In operation the thermal sensing devices 903 function to accurately measure processing liquid 108 temperatures, ambient air temperatures and temperatures within regions of interest in the inventive composite article manufacturing system, generally numbered 100. Suitable thermal sensing devices 903 include thermocouples and platinum resistance thermometers, known as RTD sensors.

In operation the pressure sensing devices 904 function to accurately measure processing liquid 108 pressures. Suitable pressure sensing devices 904 output an analogue signal that deviates in a known manner at elevated temperature. In operation the electrical current sensing devices 905 and electrical voltage sensing devices 906 function to measure the electrical power load of electric motors and the processing liquid heating system 106. This enables power consumption monitoring and fault detection. In operation the fluid level sensing devices 907 function to accurately measure the quantity of processing liquid 108, within the processing liquid storage tank 102.

This enables fluid loss monitoring and leak detection. In operation the valving 908 functions to control the passage of processing liquid 108 in the inventive composite article manufacturing system, generally numbered 100. The valving 908 is preferably actuated electrically or pneumatically and must be capable of functioning at maximum processing liquid 108 temperature.

In operation the electrically operated switches 909 are activated by the control hardware 901 to switch valving 908, the processing liquid transfer pump system 103, the processing liquid pressurisation system 104, the processing liquid circulation system 105, the processing liquid heating system 106 and the processing liquid cooling system 107. Manually operated switches 910 are included to override the control hardware 901 when required.

The invention claimed is:
1. A composite article consolidation apparatus for exercising pressure and thermal cycling for the purpose of composite article consolidation, the apparatus including:
   a processing liquid contained within a closed processing liquid filled circuit;
   a composite article processing volume having:
      an opening to facilitate loading and unloading;

processing liquid circulation processing ports to allow the simultaneous inward and outward passage of processing liquid within the closed processing liquid filled circuit, a pressurisation system having means to increase or decrease pressure within the closed processing liquid filled circuit;

a processing liquid circulation system fluidly connected to the closed processing liquid filled circuit;

an external processing liquid heating system fluidly connected to the closed processing liquid filled circuit;

an external processing liquid cooling system fluidly connected to the closed processing liquid filled circuit;

a process control system connected to the processing liquid heating system, the processing liquid cooling system and the pressurisation system;

a composite article preparation system including:
- a sealable membrane to separate the composite article and the processing liquid;
- a sealable membrane to maintain the composite article in a pressure below atmospheric pressure prior to the application of external processing liquid pressure;
- a membrane to cushion the composite article; and
- a membrane to resist adhesion of other membranes to the external surface of the composite article.

2. The composite article consolidation apparatus of claim 1, wherein the processing liquid circulation system includes a circulation device to circulate processing liquid at elevated pressure within the closed processing liquid filled circuit.

3. The composite article consolidation apparatus of claim 2, wherein the processing liquid heater system includes a heating device to heat the processing liquid within the closed processing liquid filled circuit.

4. The composite article consolidation apparatus of claim 3, wherein the processing liquid cooling system includes a cooling device to cool the processing liquid within the closed processing liquid filled circuit.

5. The composite article consolidation apparatus of claim 4, wherein the processing liquid is silicone oil.

6. The composite article consolidation apparatus of claim 1, wherein the composite article processing volume is cylindrical with an opening at one end.

7. The composite article consolidation apparatus of claim 6, wherein the processing liquid pressurisation system utilizes a hydraulic-over-hydraulic or air-over-hydraulic pump, wherein the pump contains no rotary seals.

8. The composite article consolidation apparatus of claim 7, wherein the processing liquid circulation system utilizes a hydraulic-over-hydraulic or air-over-hydraulic pump, wherein the pump contains no rotary seals.

9. The composite article consolidation apparatus of claim wherein the sealable membrane that isolates the composite article from processing liquid is the sealable membrane that maintains the composite article in a pressure below atmospheric prior to the application of external processing liquid pressure, and is a heat-sealable plastic bag.

10. The composite article consolidation apparatus of claim 9, wherein, the membrane that cushions the composite article is the membrane that opposes unwanted adhesion to the composite article, and is silicone sheeting or polytetrafluoroethylene coated material.

* * * * *